INVENTORS:
WILLY RICHTER
WERNER RINGE
By ....
their ATTORNEY

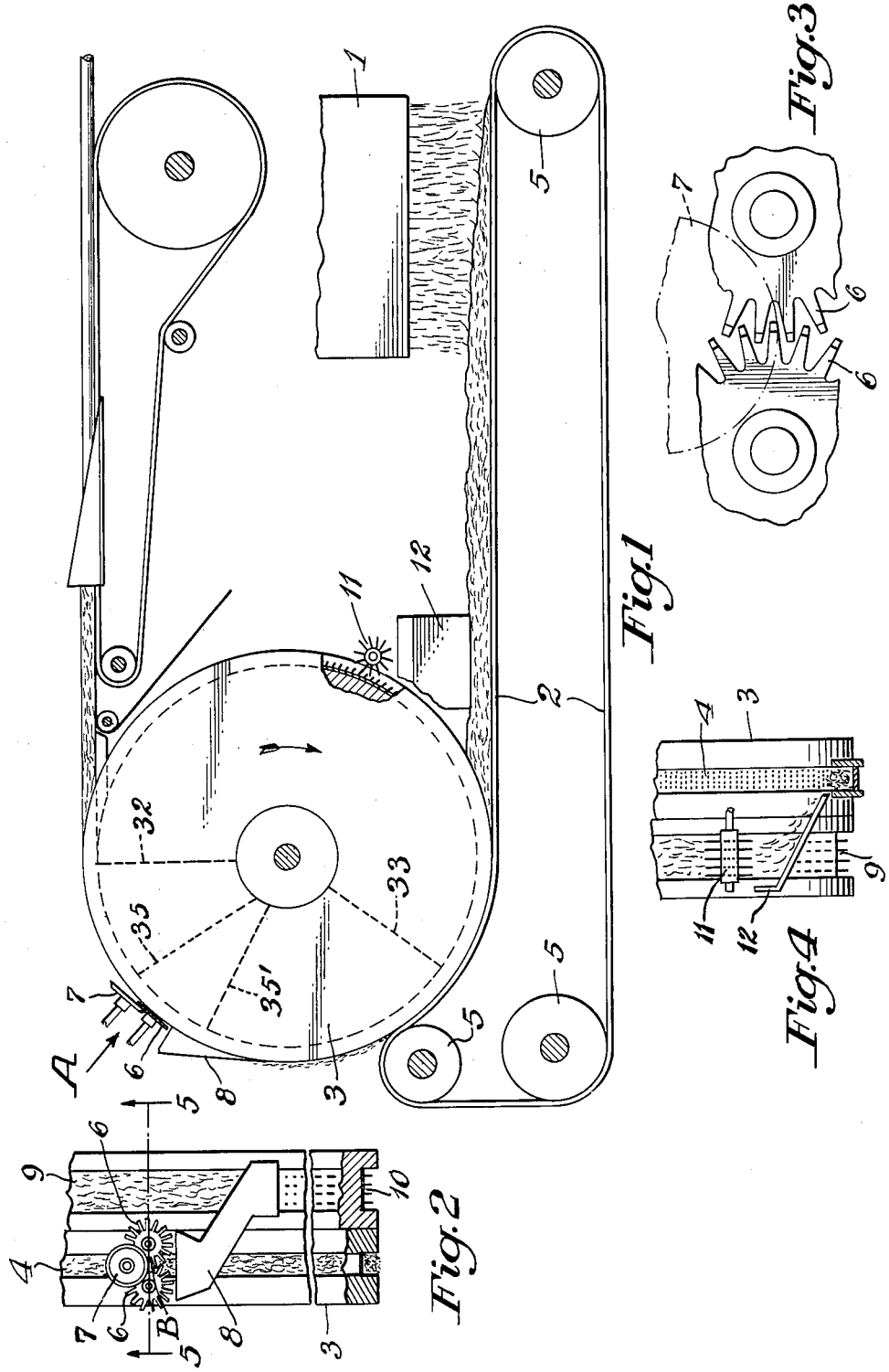

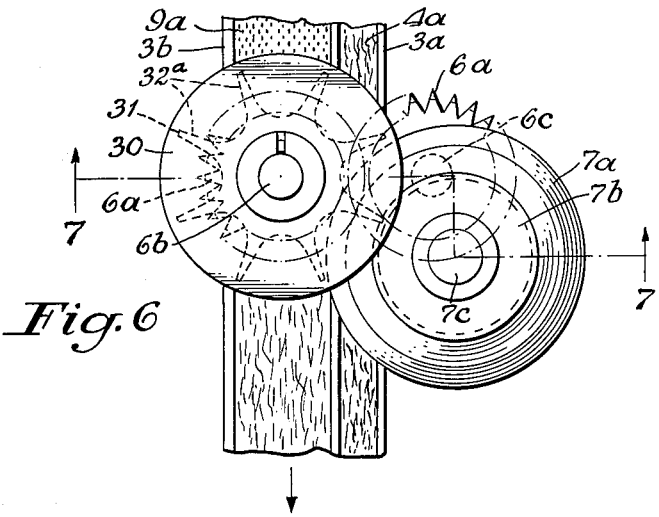
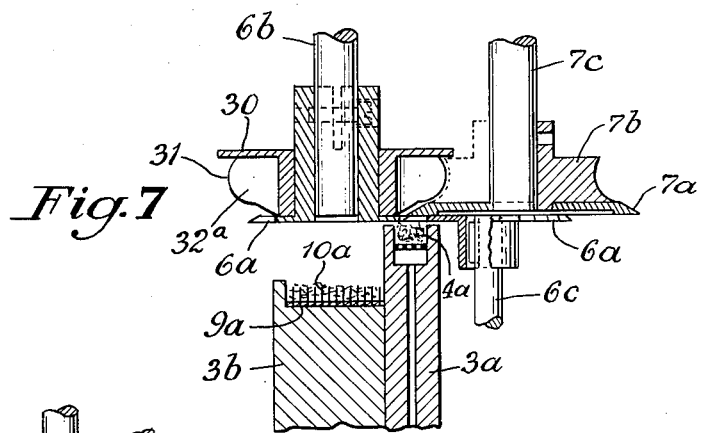
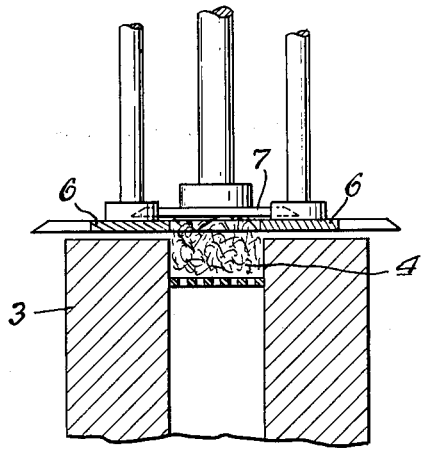
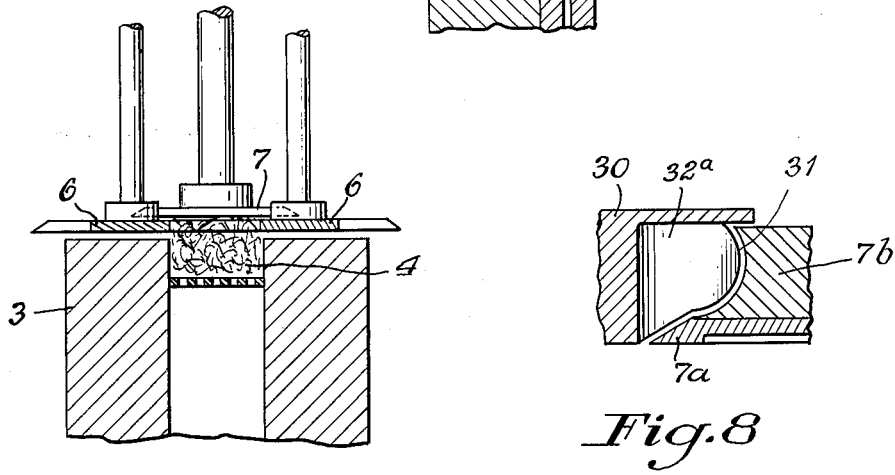

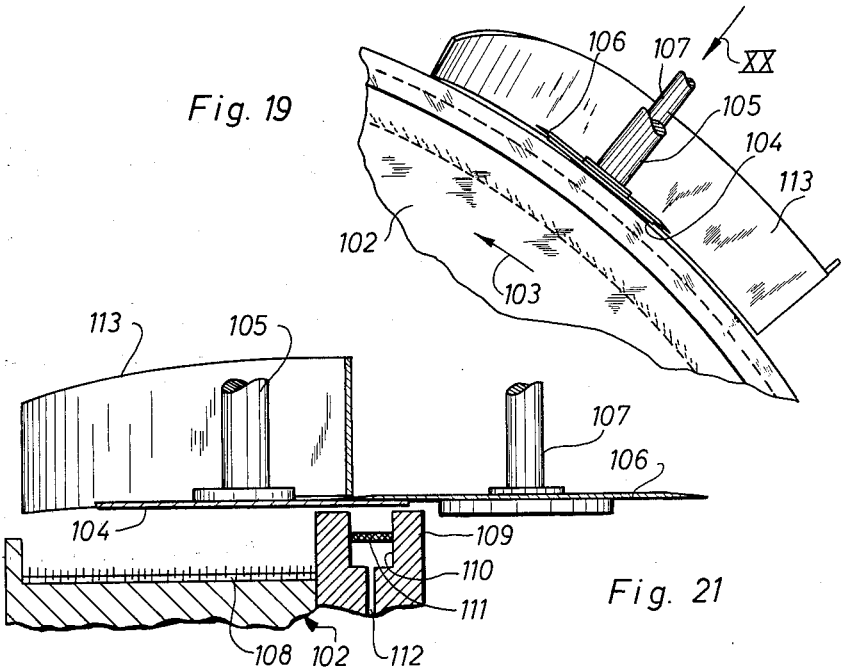
Fig. 19
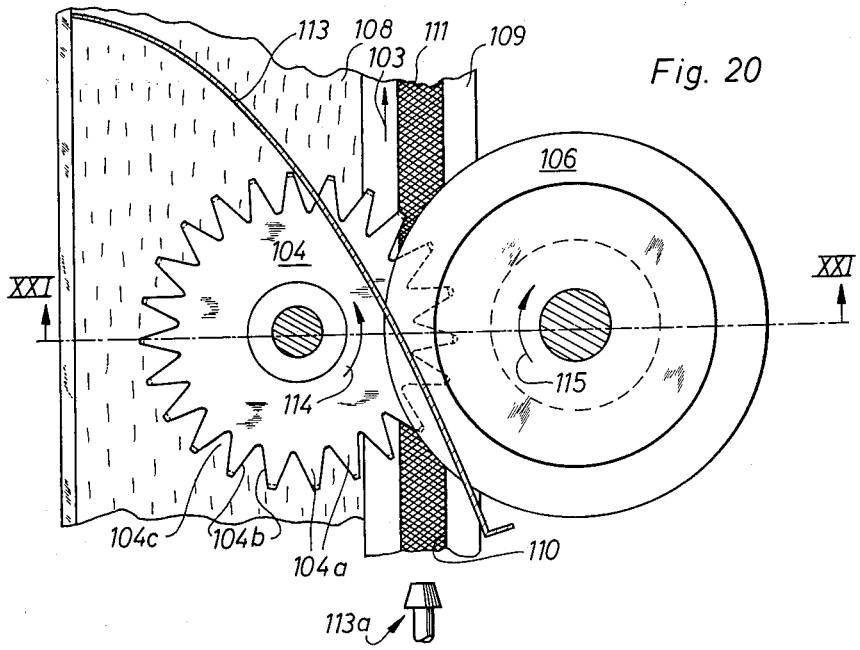
Fig. 21
Fig. 20
INVENTORS:
WILLY RICHTER
WERNER RINGE
By their ATTORNEY July 19, 1966    W. RICHTER ETAL    3,261,366
APPARATUS FOR PRODUCING A TOBACCO ROD
Filed May 28, 1964    11 Sheets-Sheet 11

United States Patent Office 3,261,366
Patented July 19, 1966

3,261,366
APPARATUS FOR PRODUCING A TOBACCO ROD
Willy Richter, Hamburg-Bergedorf, and Werner Ringe, Geesthacht, Germany, assignors to Hauni Werke Körber & Co. K.G., Hamburg-Bergedorf, Germany
Filed May 28, 1964, Ser. No. 371,888
Claims priority, application Germany, Jan. 22, 1959, H 35,431; Feb. 4, 1959, H 35,544; Apr. 20, 1959, H 36,158
14 Claims. (Cl. 131—84)

This application is a continuation-in-part of our application Serial No. 3,877, filed January 21, 1960, now abandoned.

The present invention relates to an apparatus for producing a tobacco rod, and more particularly to a machine for transforming a moving tobacco stream which contains a surplus of tobacco into a tobacco rod of predetermined cross section.

It is an important object of the present invention to provide a novel method of trimming or equalizing a moving tobacco stream in such a way that only particles of surplus tobacco are removed from the stream and that the density of the tobacco stream remains unaffected by the trimming operation.

Another object of the invention is to provide a means having the just outlined characteristics according to which the severing of surplus tobacco takes place while the particles which form such surplus are held against movement with reference to the main body of the tobacco stream so that the trimming operation cannot cause undesirable shifting of particles in that portion of the tobacco stream which is to form a rod.

A further object of the invention is to provide an apparatus of the above outlined characteristics according to which particles of surplus tobacco may be severed at the same rate of speed at which the tobacco stream is caused to advance in a tobacco rod making machine and regardless of the exact rate of speed of the tobacco stream so that such method may be resorted to in modern machines which are utilized for mass-manufacture of cigarettes and other types of tobacco containing products.

Still another object of the invention is to provide a novel trimming device which may be utilized in a machine of the just outlined characteristics.

A further object of the instant invention is to provide a trimming device which is constructed and assembled in such a way that its component parts may grip all such particles of surplus tobacco which are to be separated from the tobacco stream and that its components may provide a means to insure that the cutter cannot disturb the main body of the tobacco stream which is to form a tobacco rod.

Another object of our invention is to provide a novel transfer device which serves to deliver severed particles of surplus tobacco into such part or parts of the machine which serve to return severed tobacco particles into the untrimmed tobacco stream.

The novel features which are considered as characteristic of the invention are set forth in particular in the appended claims. The improved trimming apparatus itself, however, both as to its construction and its mode of operation, together with additional features and advantages thereof, will be best understood upon perusal of the following detailed description of certain specific embodiments with reference to the accompanying drawings, in which:

FIG. 1 is a diagrammatic side elevational view of a cigarette rod making machine with parts shown in elevation and in section, and parts broken away;

FIG. 2 is a fragmentary end elevational view of the machine as seen in the direction of the arrow A in FIG. 1 and illustrates the trimming station;

FIG. 3 is an enlarged fragmentary top plan view of two star wheels which constitute component parts of the trimming device shown in FIGS. 1 and 2;

FIG. 4 is a fragmentary end elevational view of a feed wheel in the region where the trimmed-off surplus tobacco is removed from the feed wheel, certain parts being shown in section;

FIG. 5 is an enlarged fragmentary section as seen in the direction of arrows from the line 5—5 of FIG. 2;

FIG. 6 is a fragmentary end elevational view of a modified feed wheel and a top plan view of a modified trimming device which comprises a bladed impeller wheel;

FIG. 7 is a section as seen in the direction of arrows from the line 7—7 of FIG. 6;

FIG. 8 is an enlarged fragmentary sectional view of a detail of the structure shown in FIG. 7;

FIG. 19 is a fragmentary side elevational view of a modified trimming device with a single star wheel which cooperates with a rotary suction wheel;

FIG. 20 is an enlarged fragmentary top plan view as seen in the direction of the arrow XX in FIG. 19;

FIG. 21 is a fragmentary transverse section through the trimming device as viewed in the direction of arrows from the line XXI—XXI of FIG. 20;

FIG. 22 is a top plan view of a second trimming device with a single gear-shaped gripping wheel which constitutes a modification of the trimming device shown in FIGS. 19–21, portions of the tobacco removing means being broken away;

Figure 9:
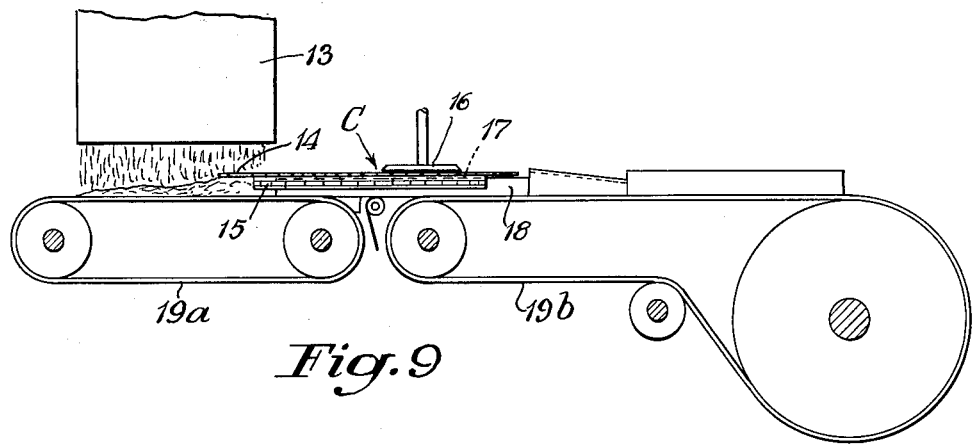
FIG. 9 is a diagrammatic side elevational view of a modified cigarette rod making machine wherein the tobacco distributor is disposed at a level above the trimming station.

Referring to FIGS. 1 to 5, there is shown an apparatus for producing a cigarette rod which comprises a distributor 1 arranged to shower tobacco particles onto the horizontal upper stringer of an endless conveyor belt 2 to form a tobacco stream which is introduced tangentially into a circumferential groove 4 provided in the periphery of a conveyor here shown as a feed wheel 3. The wheel 3 rotates in a vertical plane and the tobacco stream delivered by the belt 2 is fed into the lowermost part of the groove 4. The bottom wall in the groove 4 is perforated so that the stream of tobacco which enters this groove may be subjected to the action of suction which is effective through the bottom wall. The means for generating suction are of know construction and are not shown in the drawings. The belt 2 travels along a portion of the periphery of the feed wheel 3 before it returns to the distributor 1. As shown in FIG. 1, the belt 2 is trained around a series of rollers 5 in such a way that its upper stringer compresses the stream which enters the groove 4. The term "bottom wall" as used herein is intended to designate that wall of the groove 4 which is nearest to the center of rotation of the feed wheel 3, without regard to the angular location of the portion of the groove under discussion.

The apparatus further comprises a trimming or equalizing device located in the region indicated by the arrow A, and this trimming device serves to remove surplus tobacco from the stream which travels in the groove 4. The distributor 1 showers tobacco particles at such a rate that the stream of tobacco on the upper stringer of the belt 2 contains tobacco in excess of that required in the cigarette rod. The trimming device removes particles of surplus tobacco which project beyond the groove 4, and such trimmed-off surplus tobacco is caused to enter a hopper 8 which conveys it into a second circumferential groove 9 provided in the periphery of the feed wheel 3 adjacent to the groove 4. The bottom wall of the groove 9 has a carded surface 10 which serves to retain surplus tobacco therein. A combing roller 11 removes tobacco from the spikes of the surface 10 and feeds such tobacco into a chute 12 so that all particles of trimmed-off surplus tobacco return onto the stream which travels on the upper stringer of the belt 2. Such tobacco is then delivered into the bottom portion of the groove 4 and bypasses the trimming device.

The improved trimming device comprises a pair of intermeshing shearing members or star wheels 6 provided with tapering teeth and cooperating with a circular disk-shaped shearing member or cutter 7 which is disposed above and adjacent to the plane containing the star wheels 6, such that the wheels 6 and the cutter 7 cooperate to grip, to guide and to trim. The region B (indicated in FIG. 2) in which the teeth of the star wheels 6 intermesh is closely adjacent to the peripheral surface of the feed wheel 3, i.e., the plane of the wheels 6 is immediately adjacent to the exposed outer side of the groove 4. The circular cutting edge of the cutter 7 engages the particles of surplus tobacco in immediate proximity to the plane of the star wheels 6 and this cutter is mounted in such a way as to sever tobacco in the region B.

When the tobacco stream travels beneath the star wheels 6, the gripping faces on the teeth of these wheels engage all such particles of surplus tobacco which project beyond the open outer side of the groove 4. It will be noted that at least some of the gripping faces are inclined with reference to the direction of advance of the tobacco stream while such faces grip the particles of surplus tobacco. The surplus of tobacco thus extends outwardly and beyond the plane of the star wheels 6 and such tobacco is severed in cooperation with the revolving cutter 7 whereby the remainder of the tobacco stream in the groove 4 forms a tobacco rod of constant cross section. The teeth of the star wheels 6 travel at the same speed as the tobacco stream in the groove 4, i.e., at least such teeth which are in actual engagement with surplus tobacco will travel at the same speed as the particles engaged thereby so that the trimming operation will not cause any changes in the distribution of particles in the main portion of the tobacco stream. In other words, the teeth of the star wheels 6 do not withdraw any particles from that portion of the tobacco stream which is accommodated in the groove 4.

As mentioned above, the stream of tobacco which travels in the groove 4 may be retained by suction. In the embodiment shown in FIG. 1, the bottom wall of the groove 4 is perforated and the interior of the wheel 3 accommodates a stationary sector-shaped suction chamber which is bounded by radially extending walls 32, 33 shown by dotted lines. If desired, the suction chamber may be divided in two portions one of which extends between the walls 33, 35' and the other of which extends between the walls 35, 32. The space between the walls 35, 35' is maintained at normal atmospheric pressure so that the stream is subjected to suction on its way toward and again downstream of the trimming station but is not subjected to suction at the time the cutter 7 severs surplus tobacco therefrom.

The tobacco rod which is formed by the remainder of the tobacco stream and which advances toward the uppermost point of the wheel 3 is then conveyed into a conventional cigarette rod forming mechanism shown at a level above the distributor 1 of FIG. 1. This mechanism wraps the tobacco rod into a web of cigarette paper to form a continuous cigarette rod which is then severed to yield sections of requisite length.

FIGS. 6 to 8 illustrate a modified trimming or equalizing device which cooperates with two coaxial conveyors including a main feed wheel 3a corresponding to the feed wheel 3 of FIG. 1 and a second feed wheel 3b which is coaxial with the wheel 3a and is driven at lower speed. The wheel 3b corresponds to that portion of the wheel 3 which is formed with the groove 9, and its diameter is somewhat smaller than that of the feed wheel 3a. The groove 9a in the periphery of the wheel 3b serves to receive surplus tobacco which is removed from the stream travelling in the groove 4a of the feed wheel 3a. Such trimmed-off surplus tobacco forms a secondary stream which is retained by the spikes of a carded portion 10a in the groove 9a so that the secondary stream may be returned onto the primary stream on the belt 2 in the manner as shown in FIG. 1.

The modified trimming device comprising a pair of intermeshing star wheels 6a and a rotary disk-shaped cutter 7a. The region in which the teeth of the wheels 6a mesh (corresponding to the region B shown in FIG. 2) is closely adjacent to the periphery of the feed wheel 3a, i.e., to the open side of the groove 4a, and the plane of the cutter 7a is as close to the plane of the wheels 6a as is possible in view of the thickness of these parts. When the stream of tobacco in the groove 4a travels beneath the star wheels 6a, the gripping faces on the teeth of these wheels engage particles of surplus tobacco and hold them while they and the cutter 7a severs such surplus tobacco to transform the remainder of the stream into a tobacco rod of constant thickness. The intermeshing teeth of the wheels 6a travel at a speed which equals or approximates very closely the peripheral speed of the wheel 3a to make sure that the main portion of tobacco in the groove 4a need not be shifted while the cutter 7a trims off surplus tobacco. It will be noted that the teeth of the wheels 6 or 6a define between themselves a zig-zag shaped space through which particles of surplus tobacco extend beyond the planes of the respective star wheels. Such zig-zag space extends from the one to the other side wall of the respective groove and insures that there is no need for particles of surplus tobacco at one lateral side of the groove 4 or 4a to move to the center of the groove in order to be severed by the cutter 7a.

The drive shaft 6b of that star wheel 6a which is located above the groove 9a extends radially outwardly from the wheel 3b. The drive shaft 6c for the other star wheel 6a extends radially inwardly toward the center of the feed wheel 3a, see particularly FIG. 7. Therefore, the cutter 7a may be mounted immediately above the wheels 6a and its radially outwardly extending drive shaft 7c rotates in a fixed bearing sleeve 7b. It is preferred to mount the cutter 7a in such a way that a line which is tangential to that portion of its cutting edge which is in momentary engagement with surplus tobacco makes an angle of about 45 degrees with the direction in which the tobacco stream advances in the groove 4a. Thus, and referring to FIG. 6, if a tangent is drawn along the middle of that portion of the cutting edge on the cutter 7a which overlies the groove 4a, the tangent will make an angle of 45 degrees with the longitudinal direction of the tobacco stream in the groove 4a.

A bladed impeller wheel 30 is fastened to the drive shaft 6b. The blades 32a of this impeller wheel have edges 31 which are configured in such a way that their outline complements the outline of the bearing 7b and cutter 7, see particularly FIG. 8, and that they define a narrow slot of constant width to prevent unnecessary wear on these parts. The blades 32 serve to transfer trimmed-off surplus tobacco into the groove 9a of the second wheel 3b.

The stream of tobacco travelling in the groove 4a is retained by suction in the same way as described in connection with FIGS. 1–5.

The machine of FIGS. 6 to 8 operates as follows:

The stream of tobacco travelling in the groove 4a is retained by suction and advances past the trimming device. Suction may but need not be effective at the trimming station. The peripheral speed of the star wheels 6a is the same or nearly the same as that of the feed wheel 3a, and the gripping faces or flanks on the teeth of the wheels 6a engage such particles of surplus tobacco which extend beyond the open outer side of the groove 4a without, however, causing any shifting of the remainder of the tobacco which fills the groove 4a. Any surplus of tobacco is severed by the edge of the cutter 7a which rotates in a plane immediately adjacent to the outer sides of the star wheels 6a and in cooperation therewith. The blades 32 of the impeller wheel 30 engage trimmed-off surplus tobacco and direct it into the groove 9a where the particles of surplus tobacco are speared by the spikes of the surface 10a to be conveyed back onto the belt 2, not shown in FIGS. 6 to 8. The major part of trimmed-off surplus tobacco travels into the groove 9a with minimal deflection. Any particles which might adhere to the cutter 7a are caught by the blades 32 and are also directed into the groove 9a so that the cutter cannot circulate the particles which are severed from the remainder of the tobacco stream.

Figure 10:
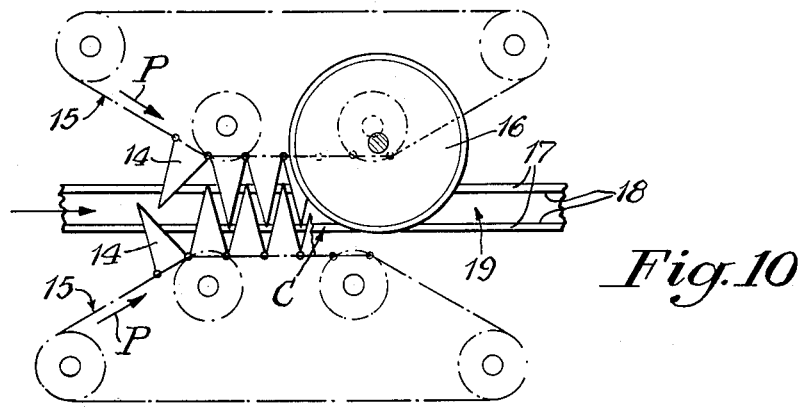
FIG. 10 is a top plan view of a trimming device which is utilized in the machine of FIG. 9.

FIGS. 9 and 10 illustrate a modified rod making machine which includes a third trimming device. This machine comprises a distributor 13 arranged to shower tobacco onto the upper stringer of an endless conveyor belt 19a and to form a tobacco stream which contains tobacco in excess of that required in the tobacco rod. Such surplus of tobacco is trimmed by a rotary disk-shaped cutter 16 which is mounted at a level immediately above two endless chains 15 having tooth-like projections 14, best shown in FIG. 10. The chains 15 are trained around suitable sprockets and are located in a common plane which is parallel with the plane of the upper stringer of the belt 19a. The directions in which the chains 15 are driven are indicated by arrows P. The head of the arrow C in FIG. 9 points to the region in which the edge of the cutter 16 severs surplus tobacco projecting upwardly through the spaces between the intermeshing teeth 14 on the chains 15. The particles of tobacco which are actually received in the spaces between the intermeshing teeth 15 are released at a point downstream of the cutter 16 to advance into a cigarette rod forming mechanism shown in FIG. 9 above the upper stringer of a second endless belt 19b. The upper stringers of the belts 19a, 19b are coplanar. The rod forming mechanism wraps the tobacco rod into a web of cigarette paper (shown at a level below the region C in FIG. 9) to form a cigarette rod of predetermined cross section. The paper web is fed upwardly through the gap between the adjacent rollers of the belts 19a, 19b. At the region C, the machine of FIGS. 9 and 10 comprises a transfer member 19 which bridges the gap between the upper stringers of the belts 19a, 19b and which is provided with side walls 18 to form an elongated groove for the stream of tobacco which is fed by the belt 19a. The projections 14 of the chains 15 travel in a horizontal plane which is immediately adjacent to the top surfaces 17 of the side walls 18 so that the cutter 16 may remove substantially all of the tobacco which extends beyond the open upper side of the groove defined by the bridge member 19.

It is to be noted that the tooth-like projections 15 are illustrated rather schematically, but FIG. 10 shows that the zig-zag shaped space defined by gripping faces of intermeshing projections 14 extends from the one to the other side of the groove in the transfer member 19. In other words, the maximum width of the zig-zag shaped space exceeds or at least equals the width of the tobacco-receiving groove in the transfer member 19. This insures that particles of surplus tobacco need not be shifted with respect to the remainder of the tobacco stream in order to move into the range of the cutter 16. The speed of the chains 15 equals or approximates closely the speed of the tobacco stream in the transfer member 19. There will be some minimal shifting of surplus tobacco when the tips of projections 14 begin to penetrate into the body of surplus tobacco extending upwardly and beyond the top surfaces 17, but such shifting is minimal because at least some particles of surplus tobacco may be deflected into the zig-zag shaped space.

Figure 11:
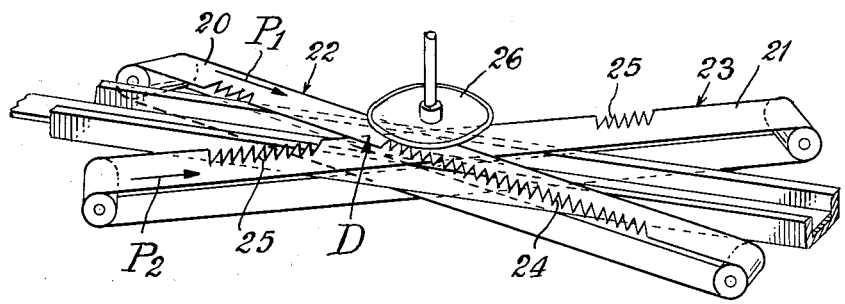
FIG. 11 is a perspective view of a further trimming device which comprises two endless gripping bands.

FIG. 11 illustrates a fourth trimming device which comprises two saw-tooth shaped endless bands 22, 23. The upper runs 20, 21 of these bands cross each other and travel in directions indicated by arrows $P_1$, $P_2$. The rollers for the bands 22, 23 guide the upper runs 20, 21 in such a way that their planes are very closely adjacent to each other and that they are located in a so-called gripping plane which is immediately below the trimming or equalizing plane of a rotary cutter 26. The runs 20, 21 cross each other in a trimming region D above the open side of a groove defined by a suitable conveyor or by a transfer member corresponding to the member 19 of FIG. 10. The tooth-like projections 24, 25 of the bands 22, 23 have gripping faces which will grip particles of surplus tobacco in the region D and will keep such particles from moving with reference to the remainder of the tobacco stream while the tobacco extending above the plane of the upper run 20 is trimmed off by the cutter 26. It is clear that the drives for the bands 22, 23 are synchronized so that both bands are driven at identical speeds and in such a way that the projections 24 and 25 intermesh and form in the region D above the tobacco-receiving groove a zig-zag shaped space.

The cutter 26 is mounted in such a way that it severs surplus tobacco at a point immediately ahead of the point where the runs 20, 21 overlap, i.e., at a point where the intermeshing projections 24, 25 still form a zig-zag shaped space. This space disappears in the area where the runs 20, 21 overlap. The particles of tobacco which are trimmed off by the cutter 26 are returned to the groove at a point upstream of the trimming station. Alternatively, such surplus of tobacco may be returned directly into a distributor corresponding to the distributor 1 of FIG. 1 or to the distributor 13 of FIG. 9.

FIGS. 12 to 18 illustrate a fifth trimming device E which is arranged to remove surplus tobacco from the circumferential groove of a feed wheel similar to the one shown in FIG. 1. This trimming device is quite similar to the one shown in FIGS. 6 to 8, but has been shown on a greatly enlarged scale together with a preferred form of drive means therefor.

Figure 12:
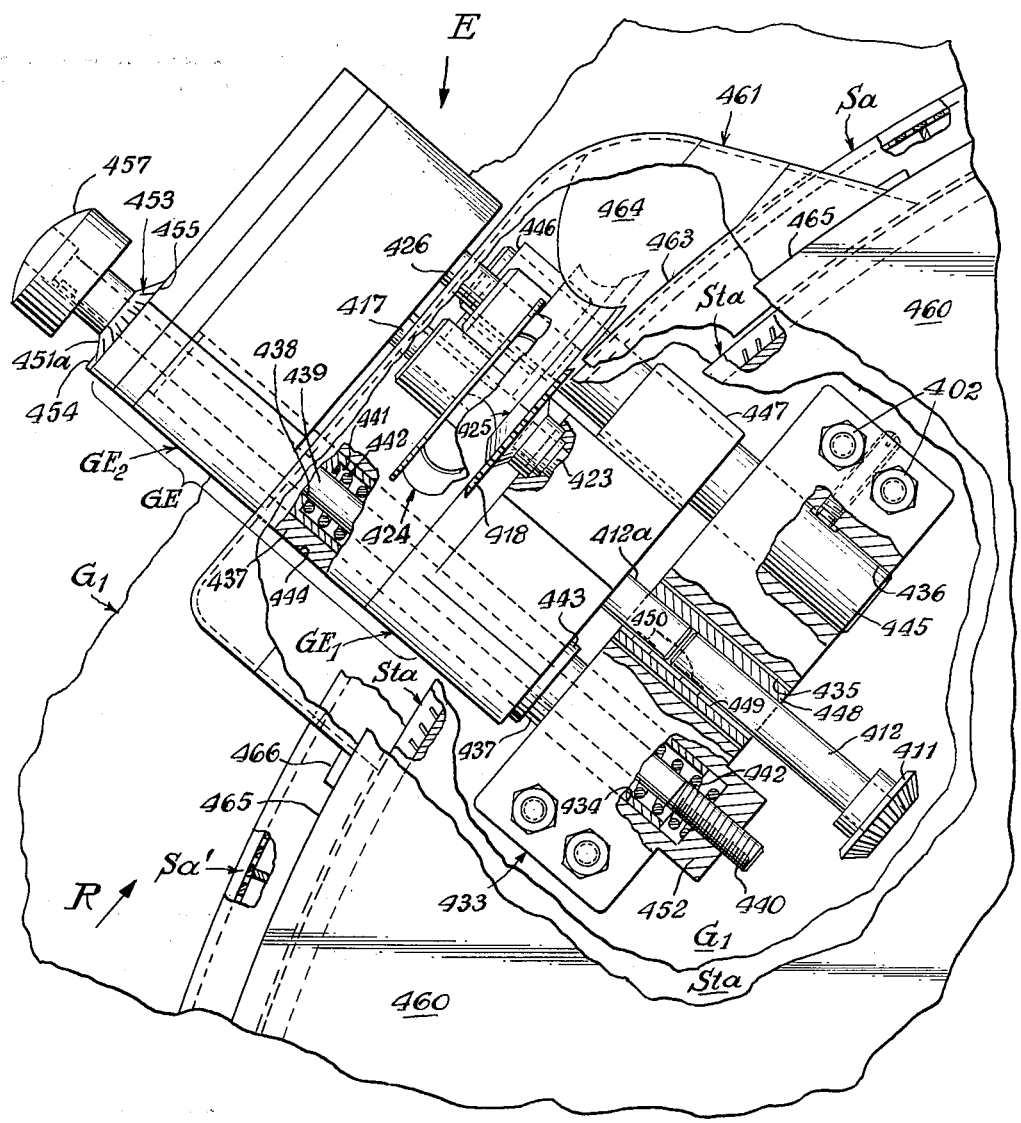
FIG. 12 is a fragmentary side elevational view of another cigarette rod making machine which is similar to the one shown in FIG. 6 and which is illustrated in elevation and with parts broken away, as seen in the direction of the arrow P in FIG. 13.
Figure 13:
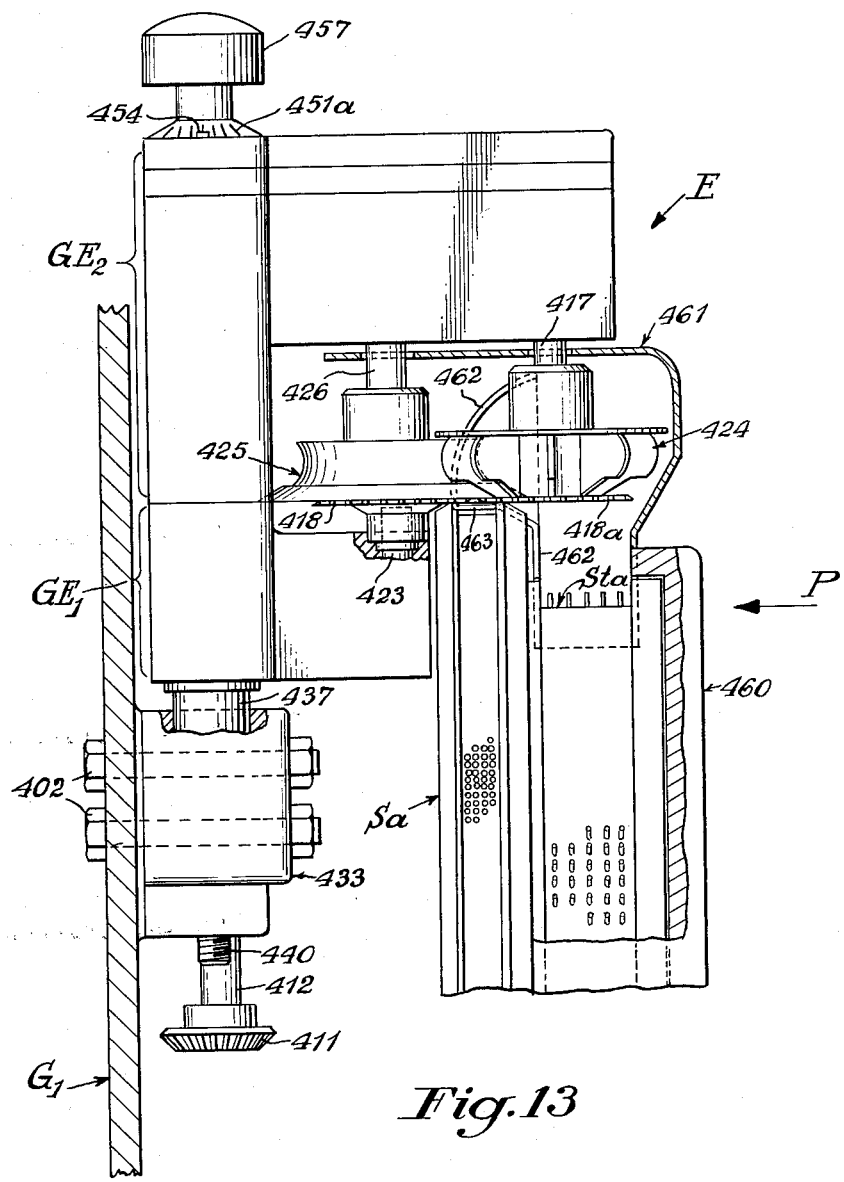
FIG. 13 is a partial end elevational and partial sectional view of the trimming device in the machine of FIG. 12 substantially as seen in the direction indicated by the arrow R in FIG. 12.

FIGS. 12 and 13 show a vertical wall $G_1$ which constitutes an element of the main frame of the apparatus and which carries a bearing block 433 fastened thereto by bolts 402. The bearing block 433 is formed with three spaced parallel bores 434, 435, 436 and the bore 434 accommodates a slidable rod 437 which may reciprocate in a direction radially of the feed wheel. The outer or upper end of the rod 437 is provided with an axial bore 438 which receives a reciprocable spindle 439, and the lower end of this spindle is threaded (as at 440) to mesh with a portion 452 of the bearing block 433. The lower end of the bore 438 in the rod 437 is enlarged, as at 441, to accommodate a helical pressure spring 442 which surrounds the spindle 439. A collar 443 on the rod 437 is adjacent to the outer end of the block 433. A gear box GE has a bore 444 through which the rod 437 extends, and one side of this gear box abuts against the collar 443, see particularly FIG. 12.

Figure 14:
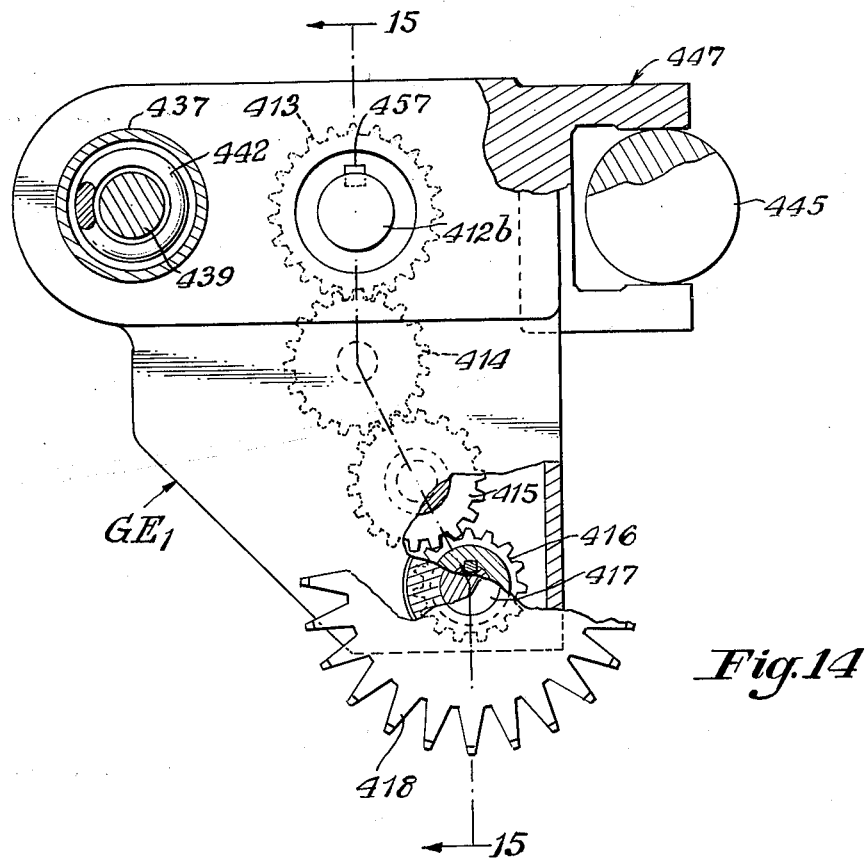
FIG. 14 is a top plan view of the lower portion of a gear box which is shown in FIGS. 12 and 13.
Figure 16:
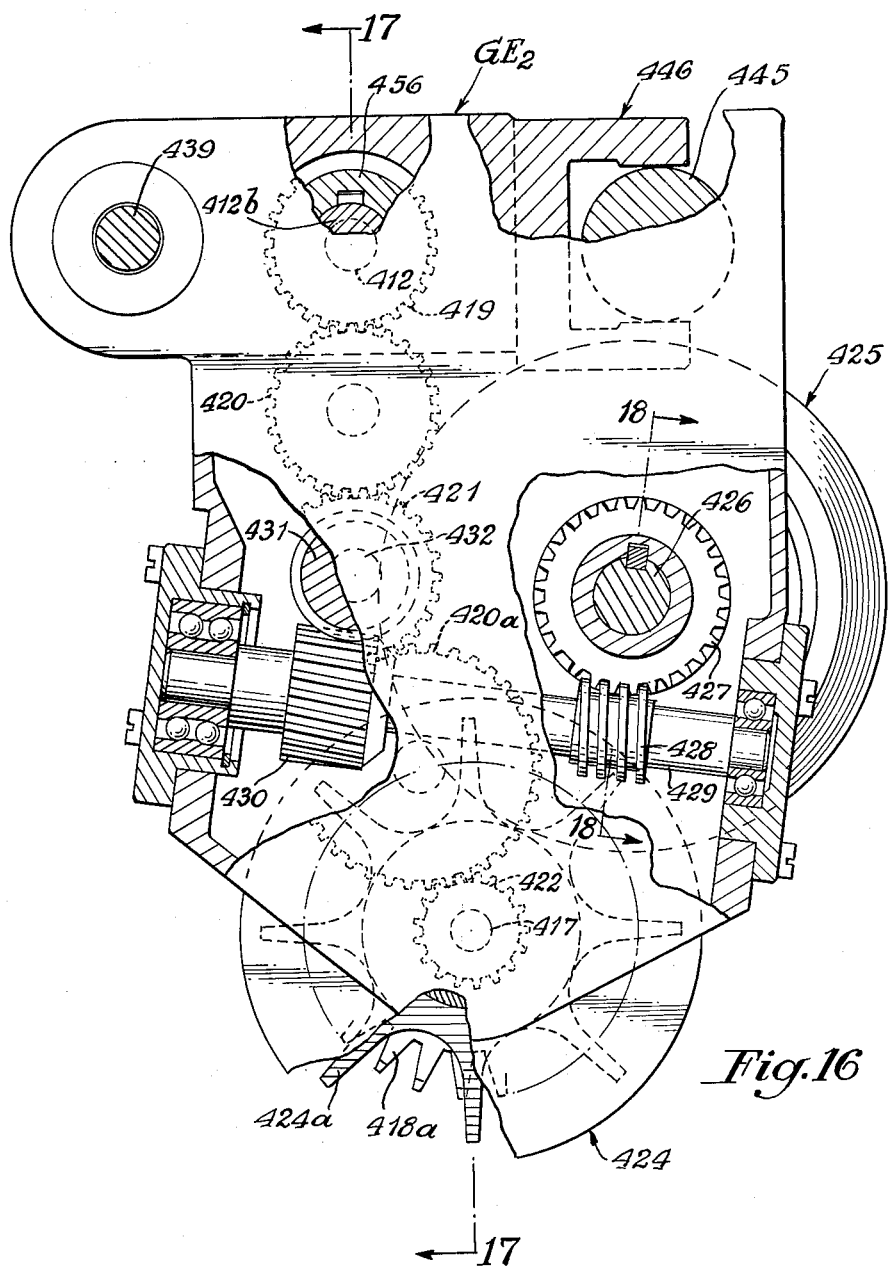
FIG. 16 is a top plan view of the upper portion of the gear box shown in FIGS. 12 and 13, with parts broken away.

The bore 436 of the bearing block 433 accommodates a rod 445 which is fixed to the bearing block by a radial screw shown in FIG. 12. The gear box GE comprises two spaced U-shaped yoke members 446, 447 which straddle the rod 445, as shown in FIGS. 14 and 16.

The median bore 435 of the bearing block 433 accommodates a rotary sleeve 448 which receives one end of a shaft 412. The other end of this shaft carries a bevel gear 411 which is driven by the main motor of the apparatus in which the trimming device is used. FIG. 12 shows a slot and key connection 449, 450 which serves to couple the sleeve when the bevel gear 411 is driven by the main motor. The slot 449 is provided in the internal surface of the sleeve 448 and is parallel with the axis thereof so that the shaft 412 may be shifted axially but continues to drive the sleeve. The other end of the sleeve 448 receives a second shaft 412a which is coaxial with the shaft 412 and which also comprises a key 450 extending into the slot 449 so that both shafts may move axially with reference to the sleeve 448. Such connection between the sleeve 448 and the shafts 412, 412a is necessary to allow for upward and downward adjustments in the position of the trimming device. The adjustments are effected in response to rotation of the spindle 439 by means of a handgrip member here shown as a knob 457 which is attached to the upper end of the spindle, as viewed in FIG. 12 or 13. In response to rotation of the spindle 439, the position of the trimming device with respect to the tobacco containing groove may be altered because the threads 440 will cause the gear box portion $GE_2$ to move toward or away from the bearing block 433. The knob 457 is provided with a collar 451a having a circular scale 453. The adjusted position of the trimming device can be read off with the help of a fixed marker 454 provided on the gear box GE. This gear box is mounted on the rod 437, and more particularly between the collar 443 and the lower face 455 of the collar 451a on the knob 457. Therefore, the gear box is secured against any movement with reference to the rod 437. The spring 442 acts between the threaded portion 452 and an internal shoulder of the rod 437 to prevent uncontrolled movements of the gear box GE. As shown in FIG. 12, the spring 442 biases the rod 437 upwardly and to the left to make sure that the distance between the collar 443 and the bearing block 433 is determined solely by the angular position of the spindle 439. The lower portion $GE_1$ of the gear box GE is shorter than the upper portion $GE_2$, see FIG. 13, and the arrangement is such that the tobacco trimming elements of the trimming device may move toward and away from the feed wheel Sa which is provided with a circumferential groove Sa'. The wheel Sa is a suction wheel and is adjacent to a carding wheel Sta. The trimming elements include two star wheels 418, 418a, a bladed impeller wheel 424 and a rotary disk-shaped cutter 425.

The cutter 425 is driven by a shaft 426 which is parallel with a drive shaft 417. This shaft 417 drives the impeller wheel 424 and the star wheel 418a. The other star wheel 418 is driven by a third shaft 423. In other words, three shafts will suffice to rotate four rotary parts or the impeller wheel and a star wheel may be driven by a common shaft.

The upper end of the shaft 412a, as viewed in FIG. 12, extends into the gear box GE and carries a gear 413 (see FIG. 15) which drives a gear 416 through a pair of intermediate gears 414, 415. The gear 416 is fixed to the shaft 417 of the star wheel 418. All of the just described gears are mounted in the lower portion $GE_1$ of the gear box GE.

Figure 15:
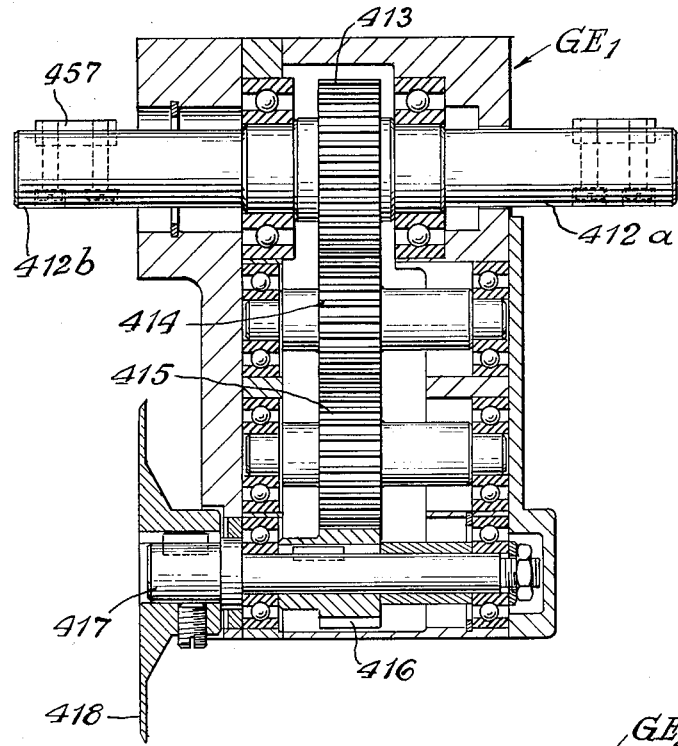
FIG. 15 is a section as seen in the direction of arrows from the line 15—15 of FIG. 14.
Figure 18:
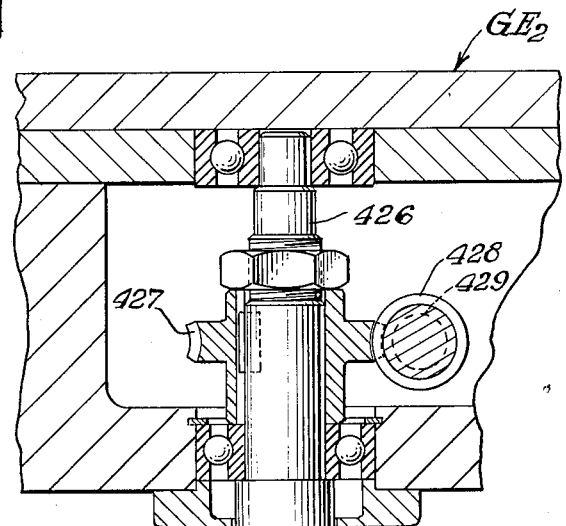
FIG. 18 is a fragmentary section as seen in the direction of arrows from the line 18—18 of FIG. 16.

The upper end portion 412b of the drive shaft 412a extends beyond the gear box portion $GE_1$ (see FIG. 15) and into the gear box portion $GE_2$. This end portion 412b is received in a sleeve 456 (see FIGS. 16 and 17) which is attached to one end of a shaft 412c. The sleeve 456 has an axially extending internal slot 458 which receives a key 457 which is also received in the end portion 412b as shown in FIG. 15, so that the latter drives the shaft 412c. The shaft 412a may be detached from the sleeve 456 in response to axial displacement of its end portion 412b.

Figure 17:
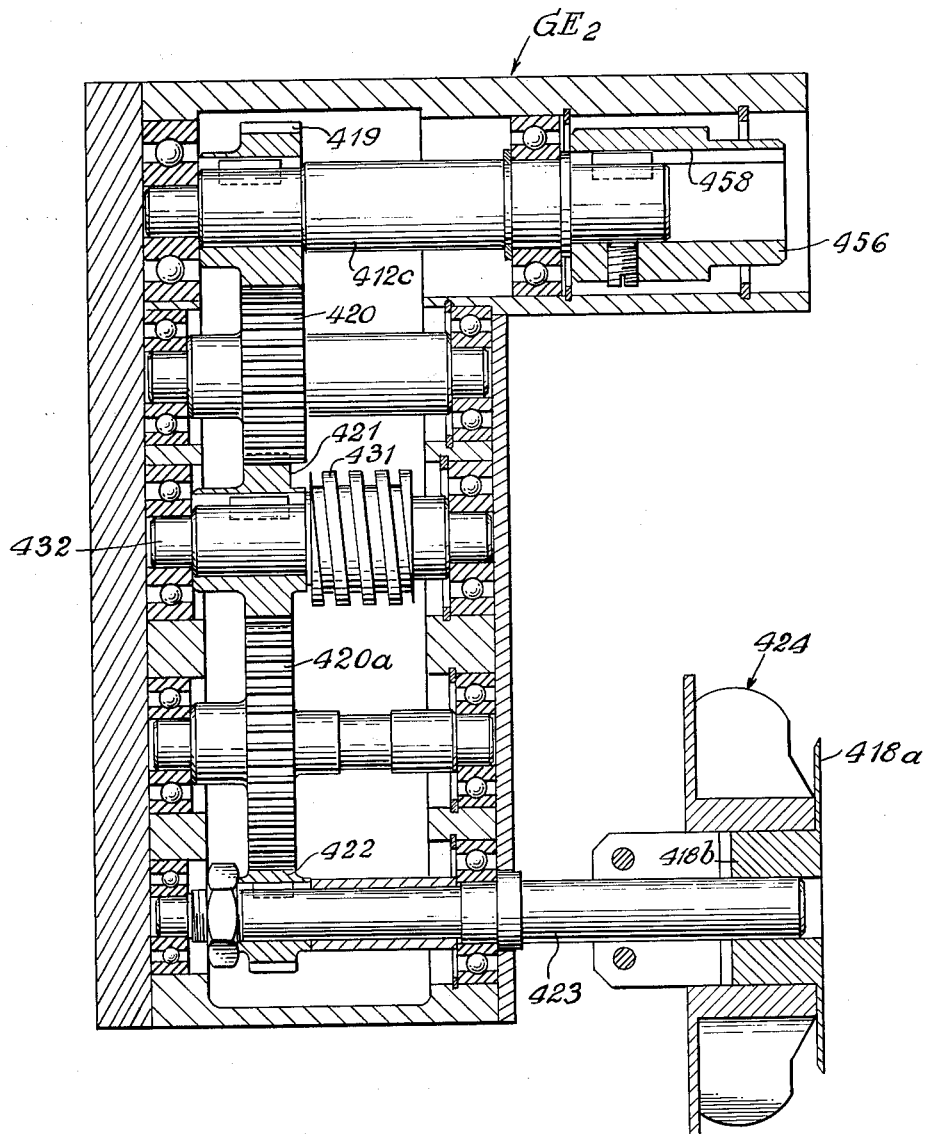
FIG. 17 is a section as seen in the direction of arrows from the line 17—17 of FIG. 16.

The shaft 412c carries a gear 419, see FIG. 17, which drives a gear 422 through a train of intermediate gears 420, 421, 420a. The gear 422 is mounted on the shaft 423 for the star wheel 418a and impeller wheel 424. This impeller wheel is mounted on the hub 418b of the star wheel 418a. The blades 424a of the impeller wheel 424 are best shown in FIG. 16. These blades extend radially and axially and have curved outer ends (see FIG. 17) to cooperate with the suitably curved hub 425a (FIG. 18) of the cutter 425. The cutter 425 is mounted on the shaft 426, best shown in FIG. 18, and is driven by a worm wheel 431 through the intermediary of a gear 430 mounted on a shaft 429, a worm 428 on the shaft 429, and another gear 427 on the shaft 426. The worm wheel 431 is mounted on a shaft 432 which carries the intermediate gear 421.

The carding wheel Sta is provided with a cover 460 which extends over the exposed periphery thereof, and the trimming device comprises a box-shaped cover 461. A guide plate 462 serves to direct the shower of surplus tobacco which is advanced by the impeller wheel 424. A portion 463 of the guide plate 462 covers the circumferential groove Sa' of the feed wheel Sa to prevent escape of the trimmed tobacco stream (i.e., of the tobacco rod) from the groove Sa'. As stated before, the bottom wall in the groove Sa' is perforated and the wheel Sa is a suction wheel so that the stream of tobacco may be retained by suction ahead of, along and past the trimming station depending on the exact configuration of the suction chamber in the interior of the wheel Sa. The guide plate 462 comprises a curved second portion 464 which is adjacent to the cutter 425 and which serves to direct surplus tobacco into the groove of the carding wheel Sta. The box 461 is attached to a portion 465 of the cover 460 by means of angular brackets 466, see FIG. 12. The portion 465 covers the grooves of the carding wheel Sta. The peripheral speed of the feed wheel Sa is such that the tobacco stream tends to leave the groove SA' by centrifugal force. Therefore, suction which is effective in the groove SA' must be strong enough to counteract such centrifugal force and to prevent uncontrolled escape of tobacco particles.

FIGS. 19 to 21 illustrate a modified trimming or equalizing device which is adjacent to the circumferential groove 110 of a feed wheel 109 rotating in a counterclockwise direction (see the arrow 103 in FIG. 19). This trimming device comprises a single gear-shaped toothed gripping wheel 104 mounted on a shaft 105 which extends radially outwardly from a second feed wheel 102, and a rotary disk-shaped cutter 106 mounted on a shaft 107 which is parallel with the shaft 105 but is located at the other side of the groove 110. The feed wheel 102 is concentric with but somewhat smaller than the feed wheel 109 and constitutes a return conveyor for surplus tobacco. It has a circumferential groove surrounding a carded surface 108. The bottom wall 111 in the groove 110 of the feed wheel 109 is an annulus of foraminous material and covers a series of suction ducts 112 machined in the feed wheel 109. The ducts 112 communicate with a fixed suction chamber (not shown) and create a pressure differential at the opposite sides of the bottom wall 111 so that the stream of tobacco entering the groove 110 may be held by suction, at least while advancing along a portion of the pathway defined by the feed wheel 109.

The plane of the wheel 104 is closely adjacent to the open outer side of the groove 110, and the plane of the disc 106 is outwardly adjacent to the plane of the wheel 104, i.e., the wheel 104 is located intermediate the tobacco stream and the cutter means 106, 107. The distance between the outer side of the wheel 104 and the inner side of the disc 107 is negligible.

As shown in FIGS. 20 and 21, the annular cutting edge of the disc 107 overlies a portion of the groove 110 and some of the teeth 104a on the wheel 104. The teeth 104a have tobacco gripping faces or flanks 104b which travel in the same general direction and at the same speed as the stream of tobacco in the groove 110. Of course, in speaking of the same general direction, only such teeth 104a are meant which penetrate into surplus tobacco while overlying a portion of the groove 110 at the trimming station. There is a curved member 113 which serves as a means for guiding severed particles of surplus tobacco into the groove of the wheel 102. The wheel 104 and the disk 106 rotate in opposite directions (see the arrows 114, 115 in FIG. 21), and the guide 113 extends across that portion of the groove 110 which is located immediately past the zone where the revolving teeth 104a enter the space which is adjacent to the exposed outer side of this groove. In this manner, the concave side of the guide 113 transfers all severed particles of surplus tobacco onto the carded surface 108 which returns the particles to the distributor (not shown) or onto the conveyor which feeds tobacco into the groove 110.

In this embodiment of our invention, the cutting edge of the disk 106 not only severs the particles of surplus tobacco but also performs the function of the omitted second gripping element by cooperating with the faces 104b of teeth 104a to prevent displacement of tobacco which is accommodated in the groove 110. The speed of the feed wheel 109 is normally such that all severed particles of surplus tobacco are hurled by centrifugal force to impinge against the concave side of the guide 113 and to slide along this guide on their way onto the surface 108. If necessary, a nozzle 113a may be located upstream of the disk 106 to discharge a jet of compressed air which assists in transferring surplus tobacco into the circumferential groove of the wheel 102.

As explained in connection with FIG. 1, suction in the groove 110 may be effective upstream and/or downstream of the trimming device and, if necessary, at the trimming station.

It is to be noted that the teeth 104a of the wheel 104 extend all the way across the groove 110 and that the depth of spaces 104c between adjoining teeth 104a may equal or even exceeds the width of the groove 110.

FIG. 22 illustrates a trimming device which is substantially identical with the device of FIGS. 19 to 21 excepting for the construction of tobacco removing means. The teeth 204a of the gripping wheel 204 are shorter and the shaft 205 of this wheel carries a hub 220 for two radial blades 221 which are soldered to the hub. The blades 221 revolve about the axis of the shaft 205 and advance severed particles of surplus tobacco along the concave side of a curved guide 213. This guide cooperates with a cylindrical guide 222 whose hub 223 is secured to the shaft 207 of the disk 206. The two guides are closely adjacent to each other in a zone which is adjacent to the open side of the groove 210 in a feed wheel 209 and located past the actual trimming station 224. The direction in which the wheel 204 rotates and in which severed particles of surplus tobacco advance along the concave side of the guide 213 is indicated by an arrow 214. The disk 206 rotates in the opposite direction, see the arrow 215. The arrow 225 indicates the direction of movement of the stream 226. The peripheral speed of the feed wheel 209 equals or approaches the speed of the teeth 204a.

The relative shortness of teeth 204 on the wheel 204 has little bearing on the effectiveness of the trimming device because the major part of the gripping action is carried out by faces which are adjacent to the roots of teeth 204.

Figure 23:
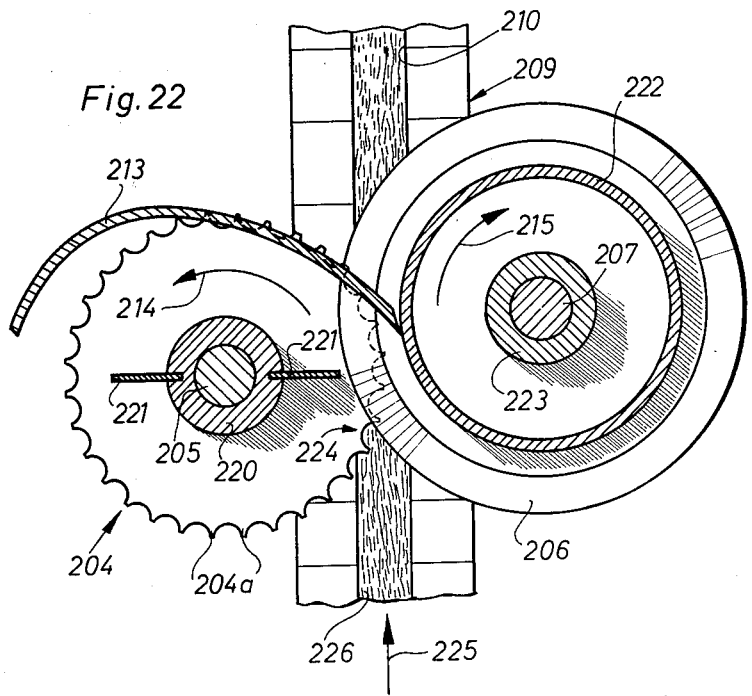
FIG. 23 is a diagrammatic top plan view of a further trimming device and illustrates a gear-shaped gripping wheel which cooperates with a hexagonal impeller.

FIG. 23 shows the star wheel 204 with a modified impeller 230 which replaces the impeller 220, 221 of FIG. 22. The impeller 230 resembles a hexagonal nut and is provided with six facets 231 which hurl severed particles of surplus tobacco against a suitable guide or directly into a return conveyor such as the second feed wheel 102 of FIGS. 19 to 21.

Figure 24:
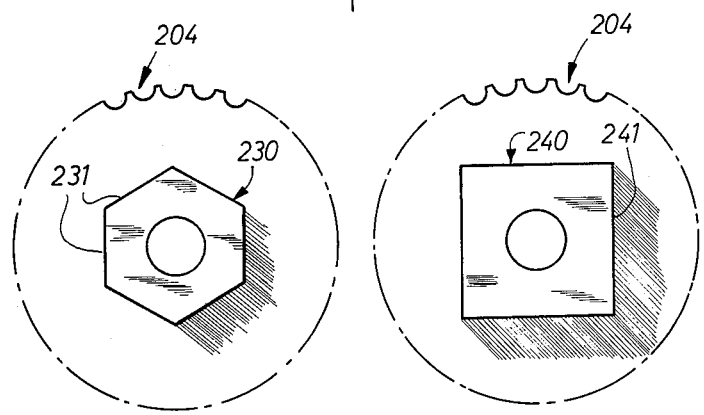
FIG. 24 is a similar diagrammatic top plan view of still another trimming device and illustrates a gear-shaped gripping wheel which cooperates with a square impeller.

In FIG. 24, the impeller 230 is replaced by a rectangular nut-shaped impeller 240 having four facets 241 of equal area. Other types of impellers including shapes with three, five or more facets may be used if desired. The impeller of FIG. 23 has been found to be particularly suited for use in our cigarette rod making machine.

A very important advantage of trimming devices shown in FIGS. 19 to 24 is that their elements may be assembled to form an exceptionally compact structure with a minimum of parts, and that the drive for the revolving parts is much simpler because the trimming device uses a single gear-shaped wheel. It goes without saying that the wheel 104 or 204 may be replaced by a moving toothed element corresponding to the elements 15 of FIG. 10 or to the element 22 or 23 of FIG. 11.

It is further to be noted that, at least in certain instances, the impeller may be mounted on the shaft 107 or 207, especially if the second feed wheel is nearer to the disk 106 or 206 than to the star wheel 104 or 204. All such modifications are so obvious in view of the showing of FIGS. 19 to 24 that each thereof will be readily understood without a separate illustration.

Without further analysis, the foregoing will so fully reveal the gist of the present invention that others can, by applying current knowledge, readily adapt it for various applications without omitting features which fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In an apparatus for producing a tobacco rod, in combination, a conveyor defining an elongated groove arranged to receive a travelling stream containing tobacco in excess of that required in the tobacco rod whereby the particles of surplus tobacco extend from said groove; and a trimming device comprising first shearing and gripping means located in a plane adjacent to a portion of said groove, and second shearing means having a cutting edge extending across said portion of the groove, one of said means overlapping the other thereof and said first shearing and gripping means having tobacco engaging faces arranged to advance in the direction of travel of the stream so as to advance particles of excess tobacco against said cutting edge whereby such particles are severed from the stream and the tobacco remaining in said groove forms a trimmed tobacco rod, at least some of said tobacco engaging faces being inclined with reference to the direction of the travel of the tobacco stream while the corresponding portion of said first shearing means moves along said portion of said groove.

2. A structure as set forth in claim 1, wherein said groove defining conveyor travels with the tobacco stream and wherein said first shearing and gripping means comprises a single moving tobacco gripping member adjacent to one side of said groove and including teeth provided with said tobacco engaging faces and arranged to penetrate into the tobacco stream so that particles of surplus tobacco extend beyond the spaces defined by the adjoining teeth.

3. A structure as set forth in claim 2, wherein said gripping member is a wheel arranged to rotate about a fixed axis which is substantially normal to said portion of the groove and wherein said second shearing means comprises a disc arranged to rotate about an axis which is parallel to said fixed axis.

4. A structure as set forth in claim 1, further comprising a device for removing severed particles of surplus tobacco, including a rotary impeller outwardly adjacent to one of said means and a second conveyor for receiving tobacco from said impeller.

5. A structure as set forth in claim 4, wherein said impeller is of polygonal outline and is provided with facets arranged to engage severed particles of surplus tobacco and to advance such particles laterally of said groove.

6. A structure as set forth in claim 4, wherein said impeller comprises a hub and at least one radial blade secured to and rotatable with said hub.

7. A structure as set forth in claim 4, wherein said tobacco removing device further comprises arcuate guide means cooperating with said impeller to direct severed particles of surplus tobacco laterally of said groove.

8. A structure as set forth in claim 1, wherein said first shearing and gripping means comprises a rotary gripping member having an annulus of said tobacco engaging faces and further comprising means for driving said gripping member at such a speed that said faces rotate substantially at a speed corresponding to the speed of the tobacco stream in said groove.

9. A structure as set forth in claim 1, further comprising means for moving said trimming device in directions transversely of said groove.

10. A structure as set forth in claim 1, wherein said first shearing and gripping means comprises a pair of endless gripping members rotatable about fixed axes and each including a wheel having teeth provided with said tobacco engaging faces, said wheels having portions overlying said groove and the faces of teeth on such overlying portions defining between themselves a gap moving in a fixed path through and beyond which the particles of surplus tobacco extend, said second shearing means comprising a rotary cutting member adjacent to said overlying portions and said cutting edge being provided on said cutting member and being arranged to sever such particles of surplus tobacco which extend beyond said gap, said trimming device further comprising means for rotating said wheels about their respective axes so as to advance said faces at speeds approximating the speed of the tobacco stream.

11. A structure as set forth in claim 1, wherein said first shearing and gripping means comprises a pair of endless gripping members having teeth provided with said tobacco engaging faces and defining between themselves a gap through which the particles of surplus tobacco extend, said trimming device further comprising means for moving said teeth substantially at the speed of the tobacco stream and said cutting edge being arranged to sever such particles of surplus tobacco which extend beyond said gap.

12. A structure as set forth in claim 1, wherein said first shearing and gripping means comprises a tobacco gripping element having an uneven periphery provided with said tobacco engaging faces, said trimming device further comprising means for advancing said faces substantially at the speed of the tobacco stream.

13. A structure as set forth in claim 1, wherein said first shearing and gripping means comprises a pair of tobacco gripping elements each having an uneven periphery provided with said tobacco engaging faces, said trimming device further comprising means for advancing said faces substantially at the speed of the tobacco stream.

14. A structure as set forth in claim 1, wherein each of said means comprises a rotary member and wherein said trimming device further comprises means for driving said members at different speeds.

References Cited by the Examiner

UNITED STATES PATENTS

| | | | |
|---|---|---|---|
| 554,635 | 2/1896 | Dela Mar | 131—84 |
| 1,306,586 | 6/1919 | Duke | 171—38 XR |
| 1,721,557 | 7/1929 | Hawkins | 131—84 |
| 2,660,177 | 11/1953 | Rault | 131—66 |
| 2,660,178 | 11/1953 | Rault | 131—84 |
| 2,846,718 | 8/1958 | Sengelaub et al. | |
| 2,949,717 | 8/1960 | Johannesen. | |
| 3,059,650 | 10/1962 | Gamberini | 131—84 |

FOREIGN PATENTS 218,648  11/1958  Australia.

SAMUEL KOREN, *Primary Examiner.*

JOSEPH S. REICH, *Examiner.*

ABRAHAM G. STONE, *Assistant Examiner.*